(12) United States Patent
Allan et al.

(10) Patent No.: US 7,490,564 B2
(45) Date of Patent: Feb. 17, 2009

(54) SUBSURFACE SOIL INJECTION APPARATUS WITH IMPROVED DELIVERY DEVICE

(75) Inventors: Michael A. Allan, Sonora, CA (US); Charles T. Schiller, Alamo, CA (US); Edward G. Salla, San Luis Obispo, CA (US); Frank V. Sances, San Luis Obispo, CA (US)

(73) Assignee: Arysta Lifescience North America, LLC, Cary, NC (US)

( * ) Notice: Subject to any disclaimer, the term of this patent is extended or adjusted under 35 U.S.C. 154(b) by 35 days.

(21) Appl. No.: 11/389,054

(22) Filed: Mar. 27, 2006

(65) Prior Publication Data
US 2007/0221105 A1 Sep. 27, 2007

(51) Int. Cl.
*A01C 23/00* (2006.01)
(52) U.S. Cl. ............................ 111/119; 111/123
(58) Field of Classification Search ......... 111/118–129, 111/7.1–7.4, 921
See application file for complete search history.

(56) References Cited

U.S. PATENT DOCUMENTS

| | | |
|---|---|---|
| 3,863,842 A | 2/1975 | McFarland et al. |
| 4,903,618 A | 2/1990 | Blair et al. |
| 5,518,692 A | 5/1996 | Grech et al. |
| 5,753,183 A | 5/1998 | Ohr et al. |
| 5,802,996 A | 9/1998 | Baxter et al. |
| 5,967,066 A | 10/1999 | Giles et al. |
| 6,029,590 A | 2/2000 | Arriola et al. |
| 2002/0117095 A1 | 8/2002 | Allan et al. |
| 2002/0148396 A1 | 10/2002 | Allan et al. |

FOREIGN PATENT DOCUMENTS

| | | |
|---|---|---|
| CH | 356 300 A | 8/1961 |
| NL | 7 101 023 A | 7/1972 |
| WO | WO 97/44127 A1 | 11/1997 |

*Primary Examiner*—Christopher J. Novosad
(74) *Attorney, Agent, or Firm*—Pillsbury Winthrop Shaw Pittman LLP

(57) ABSTRACT

An apparatus is provided for introducing a discrete, predetermined amount of material into soil at a plurality of predetermined points in the soil which includes a container for holding the material to be introduced into the soil, and tubing in fluid communication with the container at a first end thereof. At least one electrically controlled injector is provided in fluid communication with a second end of the tubing. Also, at least one shank is provided, which includes a base, and an injector mounting member attached to a surface of the base that is adapted for detachably mounting the electrically controlled injector onto the base. In addition, a controller is provided for activating the electrically controlled injector to introduce the material into the soil. Accordingly, enhanced control of the injection of the material into soil is achieved, and maintenance can be performed easily.

14 Claims, 12 Drawing Sheets

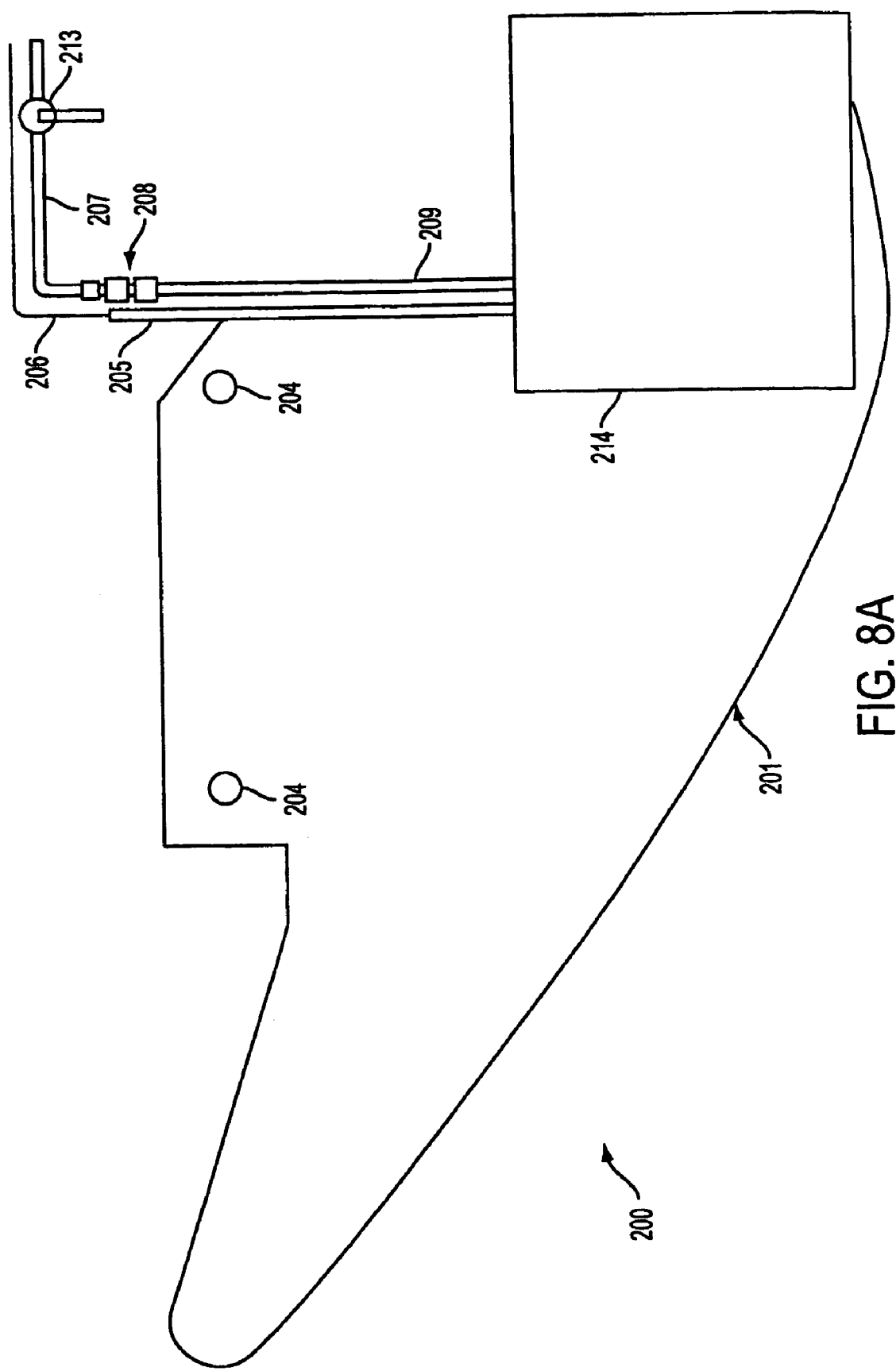

SUBSURFACE SOIL INJECTION APPARATUS WITH IMPROVED DELIVERY DEVICE

BACKGROUND OF THE INVENTION

1. Field of the Invention

The present invention relates to apparatus and distinct methodology that will improve the delivery of iodomethane or an alternative substance including but not limited to fertilizer, fumigants, non-fumigant pesticides, biologicals and other chemicals (hereinafter "products") to prepare the soil for planting. More specifically, the present invention relates to an apparatus for subsurface soil injection of a material, the apparatus having an improved device for injecting material into the soil.

2. Description of the Related Prior Art

Methyl iodide is known for use as a soil fumigant. As described in U.S. Pat. Nos. 5,753,183, and 5,518,692, methyl iodide (hereinafter "iodomethane") has been used for the effective control of soil borne plant pathogens such as fungi, bacteria, viruses; nematodes, insects and arachnids (including eggs, larva, pupae and adults), and weeds.

Also, there are devices and systems for applying substances or chemicals to soil. One such system is described in U.S. Pat. No. 6,029,590 which relates to an apparatus and method for the subsurface application of chemicals such as fertilizers, pesticides and fumigants in soil.

U.S. Pat. No. 3,863,842 describes a fertilizer applicator wherein an applicator is mounted on the rear of a shank wherein liquid fertilizer is supplied from a tank to a nozzle under regulated pressure to provide a continuous release of liquid fertilizer within a desired pressure range.

Also, U.S. Pat. No. 5,967,066 describes a system for applying ammonia to soil where a constant pressure flow rate control device is placed at ends of each of a plurality of dispensing tubes.

Known devices for application of chemicals to soil apply a constant stream of the material to the soil during a pass through the soil, either by spraying the material or applying it in some other constant manner. Thus, the fumigation equipment in use today distributes material in a continuous flow in a targeted area. Concomitantly, there is a large amount of the material applied to the target area. There is a need for a more efficient and accurate distribution of chemicals into the target soil area.

SUMMARY OF THE INVENTION

In accordance with the present invention, an apparatus is provided for introducing a discrete, predetermined amount of a material into soil at predetermined intervals in the soil. The apparatus includes a container for holding the material to be introduced into the soil, and tubing connected to the container at one end and having a distal end for introducing the material into the soil. One or more shanks are provided for placing the distal end of the tubing at a predetermined depth in the soil during introduction of the material into the soil. A switch (such as a solenoid switch) is provided for controlling flow of the material through the tubing. The switch is operable between an open state for introducing the discrete, predetermined amount of the material into the soil at a predetermined point in the soil, and a closed state when the shank is positioned between the predetermined points in the soil.

A method for applying a material to soil is also provided in accordance with the present invention. The method includes the step of introducing a discrete, predetermined amount of the material into the soil at predetermined intervals or distances along a linear path in the soil. The material diffuses into the soil from each point to provide diffusion patterns that may overlap dependent upon its targeted pest and crop (for example, tree and vine may not have overlapping patterns) in the soil.

In an alternate embodiment, an apparatus is provided for introducing a discrete, predetermined amount of material into soil at a plurality of predetermined points in the soil which includes a container for holding the material to be introduced into the soil, and tubing in fluid communication with the container at a first end thereof. At least one electrically controlled injector is provided in fluid communication with a second end of the tubing. Also, at least one shank is provided, which includes a base, and an injector mounting member attached to a surface of the base, the injector mounting member being adapted for detachably mounting the electrically controlled injector onto the base. In addition, a controller is provided for activating the electrically controlled injector such that the electrically controlled injector mounted on the base introduces the discreet, predetermined amount of material into the soil at predetermined points in the soil.

Further, a shank is provided, which includes a plate, an injector mounting member attached to a surface of the base which is adapted for detachably mounting an electrically controlled injector, and a shield attached to the base for shielding an electrically controlled injector which is detachably mounted in the injector mounting member from the soil.

BRIEF DESCRIPTION OF THE DRAWINGS

FIG. 8a is a side view of the shank with an attached shield;

FIG. 10b is a perspective view of the exploded view shown in FIG. 10a.

DETAILED DESCRIPTION OF THE PREFERRED EMBODIMENTS

Figure 1:
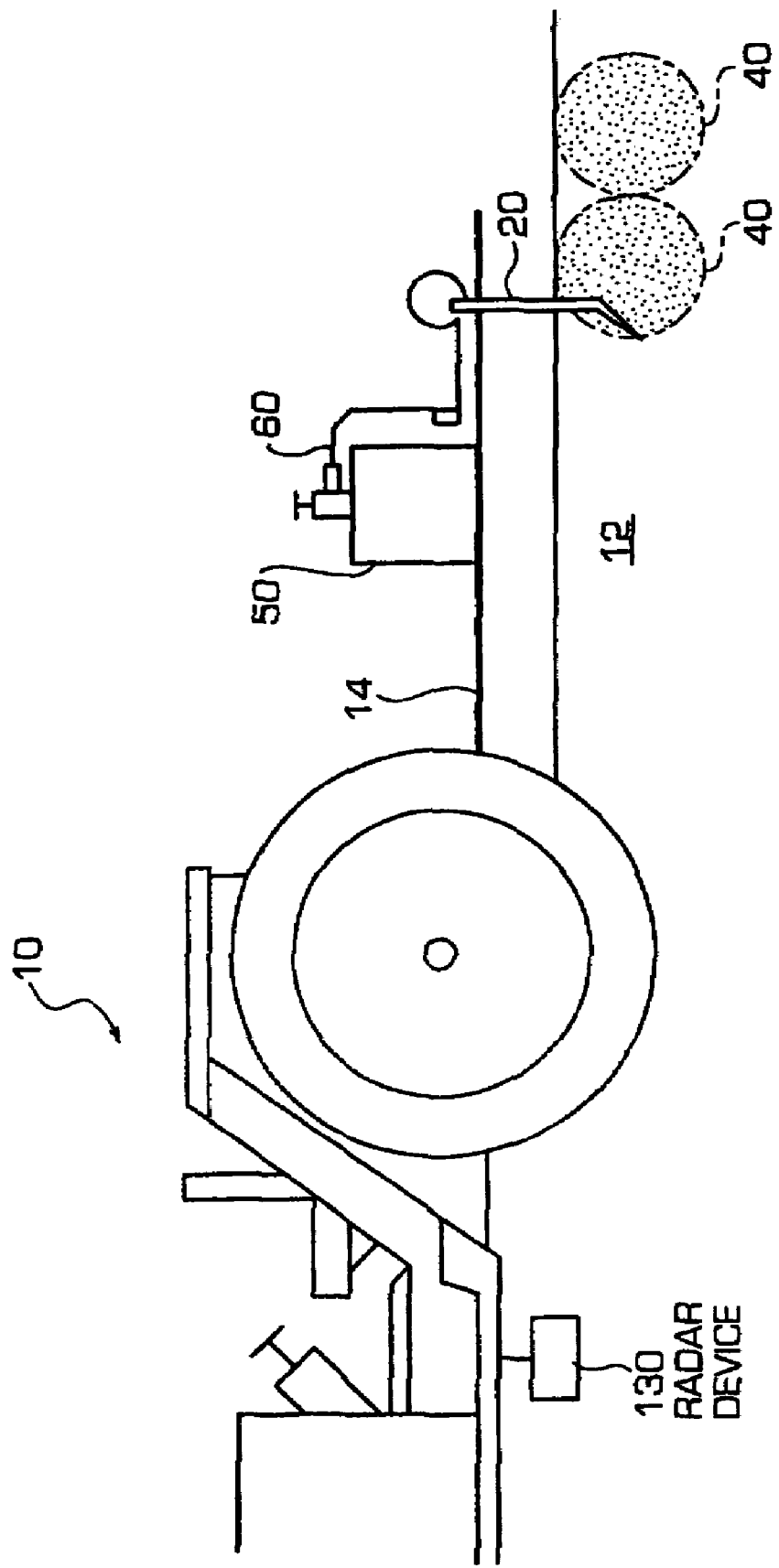
FIG. 1 is a side view of a tractor mounted system in accordance with the present invention.

In accordance with the present invention, a new method of application of products is provided that may achieve better delivery with more efficient and accurate distribution into the target soil area. Soil treatment by the method of the present invention should lower rates over what is currently used given the improved mechanism of delivery of the present invention. Compounds injected into the soil in accordance with the present invention include iodomethane, but the present invention is not limited to the application of iodomethane or even fumigants. Application of other compounds, such as fertilizers, biologicals, and non-fumigant pesticides, either alone or in combination with iodomethane are also within the scope of the present invention. For example, the apparatus and method of the present invention may be used to introduce the following chemical and biological materials into the soil: the fumigant chloropicrin (trichloronitromethane) available from Niklor Chemicals Mojave of Long Beach, Calif.; the fumigant Telone-35 (1,3-dichloropropene and 35% chloropicrin) available from Dow AgroSciences of Indianapolis, Ind.); the fumigant propargyl bromide (3-bromopropyne) available from Albermarle Corporation of Baton Rouge, La.; the liquid biological nematicide Ditera (a natural product from the hyphomycete fungus *Myrothecium* spp. composed primarily of proteins, sugars and lipids) available from Valent BioSciences of Libertyville, Ill.; the liquid Plant Pro 45 (3% iodine based ingredient) available from Ajay North America of Powder Springs, Ga.; the liquid fertilizer CAN-17 (calcium aluminum nitrate 17% solution) available from Prodica of Brea, Calif.; the liquid fertilizer UN-20 (nitrogen urea 20% solution) available from, among others, Soil Serve of Salinas, Calif.; and liquid *Bacillus subtilus* suspended in aqueous solution available from Agra Quest of Sacramento, Calif. Other chemical and biological materials such as *Pseudomonas* sp. suitable for injection into soil in accordance with the present invention will be apparent to one skilled in the art. The material introduced into the soil in accordance with the present invention may be either a liquid or gas.

Materials introduced into the soil in accordance with the apparatus and method of the present invention which include a volatilizing ingredient, such as fumigants, will form a diffusion pattern that advantageously spreads out in all directions from the injection site. Materials such as fertilizers which do not contain a volatilizing ingredient, are typically placed at or near the root zone of the plant. In accordance with the apparatus and method of the present invention, these types of materials may be precisely placed at this location. Thus, while these types of materials lack a volatilizing ingredient, they can be precisely placed within the root zone and form a desired diffusion pattern, albeit not in all directions through the soil. Thus, the user may introduce material into soil in accordance with the present invention to form diffusion patterns of the material in the soil at adjacent injection points which touch, overlap or are intermittent, i.e., are not touching at all, as desired.

The invention is described herein in connection with the soil fumigant iodomethane. As discussed above, however, it being understood that the present invention is not limited to the introduction of solely this material into soil.

Efficacy testing using known application equipment with iodomethane has shown irregularities in product distribution within the soil. In this regard, conventional flow meters, tubing and orifice sizing and a radar equipped digital system have shown to be unreliable in accurate and consistent delivery of a target rate (gal/treated acre, lb/treated acre, or liters/treated hectare) to the soil applied by multiple types of shanks (either flat/broadcast or bed shank). Fluctuations in the known systems of delivery when applying iodomethane (in contrast to the application of methyl bromide, another fumigant being phased out because of environmental regulations) are thought to be in part the result of differences in the physical properties between iodomethane and methyl bromide. Conventional equipment is specific to a single chemical (for example, methyl bromide) and does not provide adequate crossover for use with other materials. For example, the density of iodomethane is 2.3 g/L, while the density of methyl bromide is 1.7 g/L. In any event, fluctuations in delivery of the fumigant results in either too much or too little compound being applied and/or irregular patterns of material being distributed in the treatment area.

In accordance with the present invention, problems in fluctuation of application of iodomethane using conventional systems are avoided. A single injection point in accordance with the present invention will have a maximum distribution or diffusion pattern ("affected treatment area") in the soil of the applied chemical or chemicals that if desired, touches or overlaps with diffusion patterns from adjacent injections In accordance with the present invention, the amount of material introduced into the soil for treatment thereof may be reduced. In this regard, the diffusion pattern can be determined for a given fumigant in a given soil type with single injection points at equal intervals in accordance with the present invention overlapping in the gas phase, for example, and moving equally through the soil profile or column. Conventional equipment does not allow for injection of materials at prescribed intervals in a linear pattern, as in the present invention. Accuracy in delivery of soil fumigants in accordance with the present invention will provide for significantly reduced application rates, reduced worker exposure and greater safety in application and handling, less cost per acre to the grower and significantly reduced emissions of fumigant into the atmosphere.

In accordance with the present invention, fumigation rates, for example, may be reduced by about 40%, and in some cases the reduction may be up to about 50%, depending on soil conditions and other factors, compared to conventional systems for applying fumigants. For example, if injections are made at one foot intervals in accordance with the present invention, as opposed to a conventional continuous flow, then a reduction in the applied rate of 50% can be expected from a traditional bed shank treatment.

The amount of treatment material applied to the soil in accordance with the present invention will vary depending upon the material being applied to the soil, soil conditions, etc. For the fumigant iodomethane, for example, the fumigant may be applied in an amount of preferably about 3 gal/treatment acre to about 12 gal/treatment acre, more preferably 3 gal/treatment acre to about 9 gal/treatment acre, and most preferably about 3 gal/treatment acre to about 6 gal/treatment acre.

Iodomethane, a preferred fumigant for use in the apparatus and method of the present invention, is a colorless liquid at 20° C., and will flow through injection equipment and/or tubing at ambient room temperature. Its solubility in water is 14.2 g/L, such that it can be mixed with water without the use of emulsifiers. Further, iodomethane in the presence of light turns orange-brown and rapidly photodegrades. Its lifetime in the atmosphere is 1.5-4 days, which inhibits it from reaching the ozone layer and therefore iodomethane is classified as a non-ozone depleting compound (the ozone depleting potential of methyl iodide is 0.0015 as reported by Ko, "Estimates of Atmospheric Lifetime, Global Warming Potential and Ozone Depletion Potential of Iodomethane ($CH_3I$)", Executive Summary III, Atmospheric and Environmental Research, Inc. (Report Date Oct. 31, 2000). The corrosiveness of iodomethane to carbon steel has been documented and in some cases iodomethane has been corrosive to poly vinyl chloride (PVC) pipe. Accordingly, there should be the appropriate selection of materials for handling iodomethane, as one skilled in the art would recognize and address in a suitable manner (as discussed below suitable materials for handling iodomethane are commercially available). The volatility of iodomethane is similar to that of methyl bromide. Iodomethane has a Henry's Law Constant of 0.22 compared to 0.24 for methyl bromide, which means that iodomethane, like methyl bromide, will change from a liquid to a gas once it is injected into the soil. The molecular weight of iodomethane is 141.9, and it has a density of 2.28 g/ml. Iodomethane is non-flammable and non-explosive, and it currently finds uses in the fields of medicine, organic synthesis, microscopy, and testing for pyridine.

While not wishing to be bound by theory, it is believed that iodomethane's mode of action as a fumigant is through the bimolecular nucleophilic displacement ($SN_2$) reaction with functional groups such as $NH_2$ and SH, in various amino acids and peptides in target organisms.

In accordance with the present invention, iodomethane can be introduced into the soil as a stand-alone product or in combination with other soil fumigants, e.g., chloropicrin or other products such as biologicals, etc., and it is injected into the soil for control of soil born pests and disease.

Referring now to FIGS. 1-4, the soil injection apparatus in accordance with the present invention is preferably mounted to a vehicle such as a tractor for delivery of the material into the soil. Other vehicles, for example, a pick-up truck, may of course be used to transport the apparatus.

Figure 2:
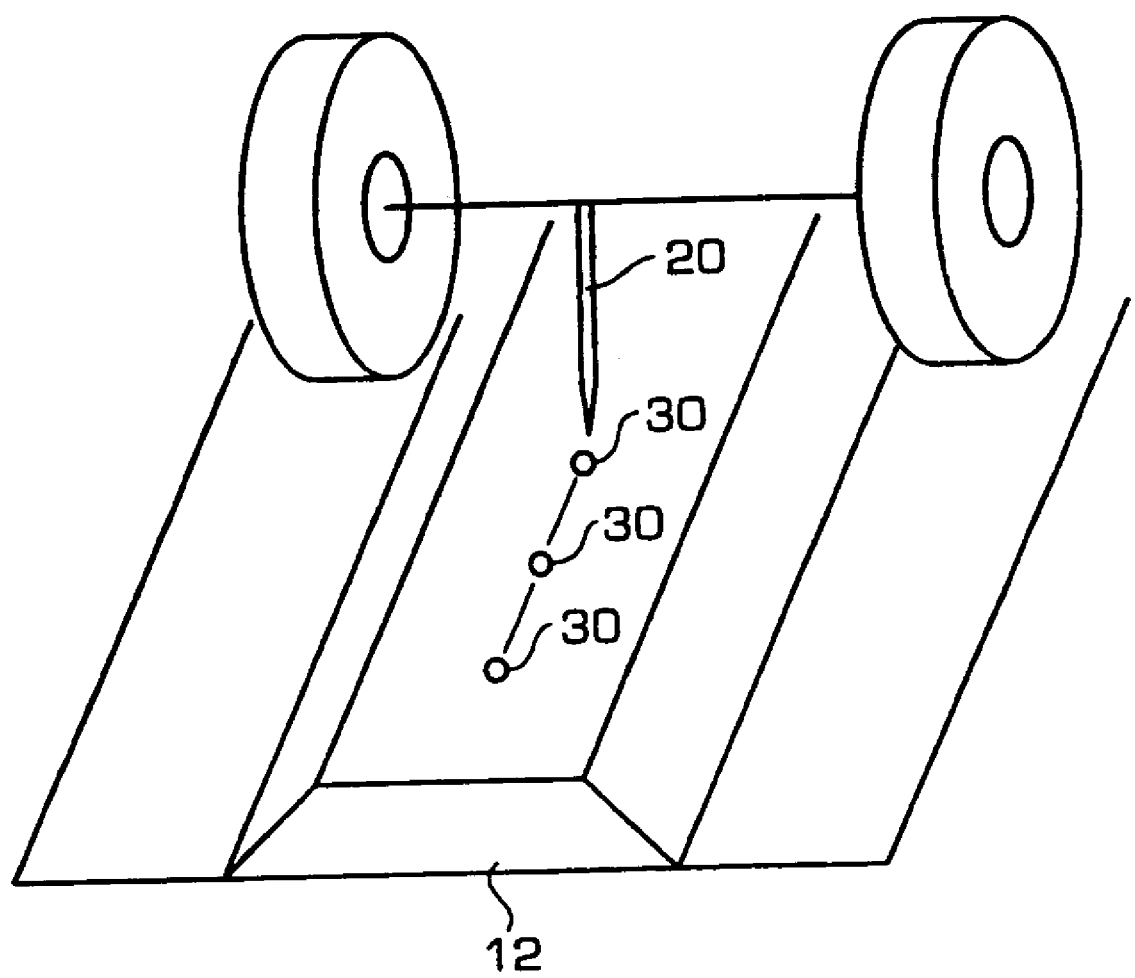
FIG. 2 is a perspective view showing a shank portion of an apparatus for injecting fumigant in accordance with the present invention and several injection points.

As shown in FIG. 2, tractor 10 may be used to make a single pass through soil 12 with shank or shovel 20 allowing for injections of fumigant at points 30 at pre-determined intervals, for example, 6 inches apart along a linear path. The fumigant iodomethane, for example, may be injected into soil in accordance with the present invention at substantially equidistant points in the soil preferably at about 3 to about 12 inches apart, more preferably about 5 to about 12 inches apart and most preferably about 8 to about 12 inches apart.

The shape of shank(s) 20 is not limited, and shank(s) 20 may have any suitable shape provided it allows for injection of material into the soil in accordance with the present invention.

Figure 5:
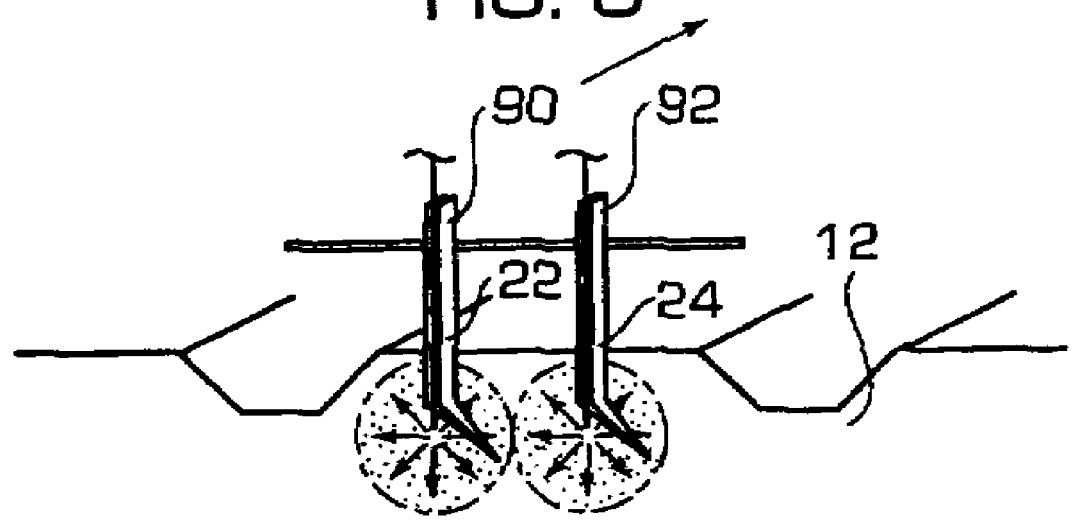
FIG. 5 is a perspective view showing two shanks injecting fumigant into a row of soil in accordance with the present invention as they travel through the soil in the direction of the arrow.

As discussed above, in the case of fumigants containing a volatile ingredient the material enters the soil as a liquid but quickly turns into a gas where it travels in all directions through the soil pore spaces providing control of target organisms within a distinct layer of the soil profile with minimum disturbance to soil structure. This is shown in FIGS. 1 and 5 as diffusion areas 40.

As one skilled in the art will appreciate, the distance between injection intervals is dependent upon the diffusion pattern of the injected material in the soil. These patterns are influenced by soil type, condition and target organism to be controlled. Thus, as described above, the injection points may be anywhere up to about 12 inches apart for iodomethane, but distances between injections of beyond 12 inches even for iodomethane are within the scope of the invention depending upon soil conditions, etc. Further, as will be appreciated from the following, material is injected into the soil only when tractor 10 is in motion and the injection tubes are in the soil, thus maintaining a closed fumigation system to the treatment area.

The depth of the injection sites in accordance with the present invention will vary depending upon soil type and whether the crop to be planted after fumigation is shallow-or deep-rooted. Examples of shallow-rooted crops are strawberries and tomatoes, while deep-rooted crops are trees and vines. For shallow-rooted crops, the depth of injection in accordance with the present invention is preferably about 1 inch to about 12 inches, more preferably about 1 inch to about 8 inches, and most preferably about 1 inch to about 6 inches, below the surface of the soil. For deep rooted crops the depth of injection in accordance with the present invention is preferably about 18 inches to about 24 inches, more preferably about 20 inches to about 24 inches, and most preferably about 22 to about 24 inches, below the surface of the soil.

Figure 3:
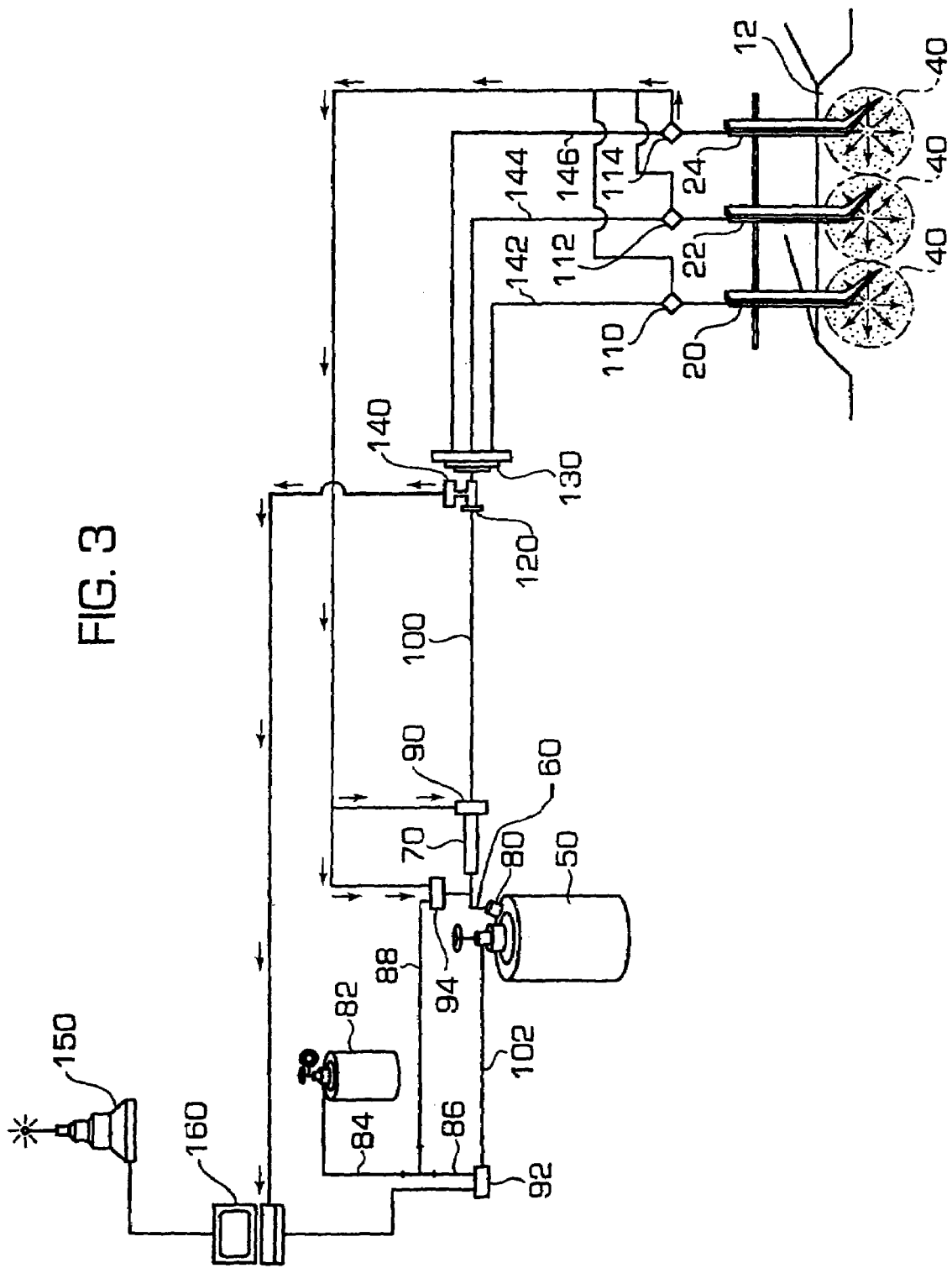
FIG. 3 shows an apparatus suitable for injecting fumigant into soil in accordance with the present invention.

Referring to FIGS. 1 and 3, iodomethane may be stored in a stainless steel or other suitable contained 50 mounted on tool bar 14 or other similar structure attached to, for example, tractor 10. Alternatively, as mentioned above, container 50 may be transported in any other suitable manner, such as by a pick-up truck. Material stored in tank 50 flows through tubing 60 into a reservoir 70. One-way valve or switch 80 at the outlet of container 50 allows material to fill reservoir 70 and also for gas to prime the reservoir, as will be discussed below. A source of compressed gas, such as nitrogen or a similar gas is provided by container 82. Compressed gas flows from container 82 through tubing 84 to tubing 86 and 88. A solenoid switch 92 is provided to control the flow of compressed gas in line 102 which is connected to tank 50. Similarly, a solenoid switch 94 is provided in tube 88 to control the flow of compressed gassed therethrough to reservoir 70.

Global Position Satellite (GPS) device 150 or a similar device such as a radar device mounted to the apparatus of the present invention tracts movement (speed and location) of the apparatus and inputs this information into computer 160. Other information is also provided by a user to computer 160 including the rate of application of the material, number of nozzles, weight/density of the materials, depth of injection, distance between pulses and target ground speed, and computer 160 provides the appropriate signals to the apparatus, namely solenoid 92 in accordance with programming software previously inputted into computer 160 by one skilled in the art.

Solenoid switch 90 is provided at the outlet to reservoir 70 and opens to allow material to flow through tubing 100 and out through shanks 20, 22, 24, etc. At the appropriate time, gas sensors 110, 112, 114, etc., provide an electrical signal for closing solenoid switches 90, 92 and/or 94. Orifice plate 120 is provided for regulation of various liquids/gas materials to manifold 130. Flowmeter 140 tracks the rate of flow through tubing 100 and out through tube shank lines 142, 144, 146, etc., to shanks 20, 22, 24, etc. At manifold 130, the material is divided into equal parts for delivery through tube shank lines 142, 144, 146, etc.

A single injection or pulse unit for subsurface soil injection in accordance with the present invention may be operated in the following manner where a single pulse unit is the application or amount of a fertilizer, biological or chemical, such as iodomethane, from a storage tank into the lines and out through shanks placed at a predetermined depth and location in the soil.

First, computer 160 has the following input of data:
1. Rate of Application in amount of material;
2. Number of injection nozzles;
3. Weight/density of the material;
4. Location of treatment area according to GPS coordinates;
5. Depth of injection of shanks;
6. Physical state of material (gas or liquid);
7. Distance between "Pulse Units"; and
8. Ground Speed (Inches/sec).

The equipment is then moved into the treated area and position verified by GPS.

The equipment initiates movement and the computer receives input to initiate a single pulse to the injection system.

Input is received at the solenoid switch 92 to release iodomethane from pressurized storage tank 50 and into reservoir 70. Tank 50 is held at a constant pressure by input line 102 from nitrogen tank 82.

Solenoid switch 92 closes and the exact amount of material for a single pulse is held in reservoir 70.

Solenoid switch 94 is opened to allow nitrogen or compressed air to pressurize the material in reservoir 70. When the desired pressure is reached in reservoir 70, solenoid switch 90 is opened so that the material is released from reservoir 70 and pushed through tubing 100 and out to manifold 130. However, in an alternate embodiment with electrically controlled injectors, which is described in detail below, tubing lines may be employed as a reservoir.

At manifold 130, the material is divided into equal amounts depending upon the number of shanks being driven through the soil.

Pressure is still pushing the material from solenoid switch 90 and will distribute the material to each shank tube line 142, 144, 146, etc., and out through each nozzle.

Near the nozzle at the end of each shank tube line 142, 144, 146, etc., there is a gas sensor 110, 112, 114, etc., that determines when the entire amount of material has been expelled from the tubing and then sends a signal to solenoid switch 94 to close and stop the flow of gas. The gas sensors may be eliminated, if desired. However, in an alternate embodiment to be discussed below, gas sensor 110, 112, 114, etc., may be provided near the end of the nozzle of each electrically controlled injector to determine if the electrically controlled injectors become clogged.

The equipment continues to travel to the next injection point and is ready for the next injection.

The entire injection apparatus should be a closed system to insure safety to the various personnel involved in mixing, loading and applying the fumigant in accordance the present invention. As discussed above, the material to be applied to the soil may be expelled from the container by either nitrogen compressed gas or similar non-reactive gas. Alternatively, one skilled in the art will recognize that the same result may be achieved by a pump, the pump being a relatively accurate pump. Thus, injections of material into the soil in accordance with the present invention may be made with a positive displacement pump, but of course diaphragm, roller, impeller or other pumps may also be used.

In accordance with the present invention, the quantity of material needed for a single injection may be drawn from the tank. The exact amount drawn is determined by the target rate to be applied/acre taking into consideration the ground speed of the tractor. Ground speed may be determined by radar device 130 mounted on tractor 10 (see, FIG. 1) or in any conventional manner, and transmitted to computer 160 that will regulate the feed of more or less of material from tank 50 to tube line 60.

As iodomethane is pushed through the nozzle opening at the distal end of tube shank lines 142, 144, 146 etc., and injected into the soil in accordance with the present invention, it does not create a fan or spray pattern. Instead, a reservoir of material is deposited to a single point in the soil where it will distribute through the soil and, if desired, overlap with the diffusion pattern or areas of adjacent soil injections. Thus, no special shape of the nozzle is required so long as a suitable injection in accordance with the invention is achieved. However, the nozzle opening may, if desired, be provided with a valve (not shown) such as a shut-off valve operated by, for example, pressure, or any suitable one-way valve to inject the material into the soil but prevent dirt from entering the nozzle. Further, an alternative embodiment is described below wherein each shank is provided with an electrically controlled injector for injecting the material into the soil.

Figure 4:
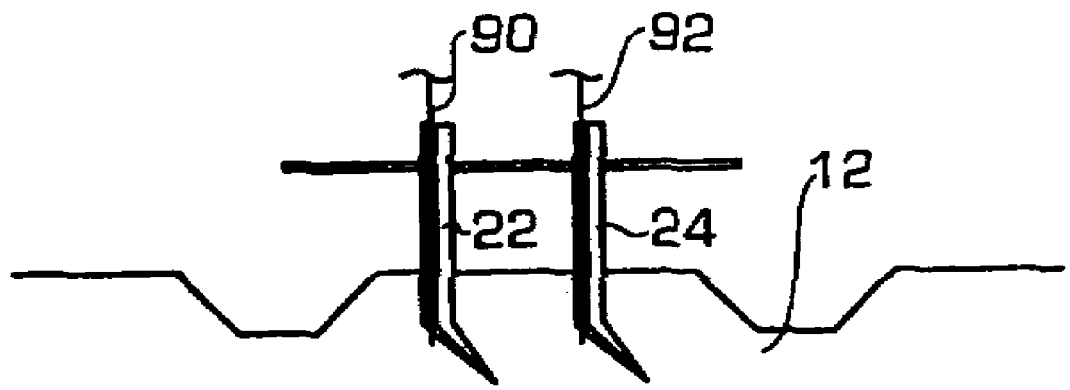
FIG. 4 shows two shanks injecting fumigant into the soil in accordance with the present invention.

In accordance with the present invention, the material is released from nozzles at the end of tube shank lines 142, 144, 146, etc., attached to shanks or shovels 20, 22, 24, etc., at equal intervals as determined by soil type, rate, depth of injection, diffusion pattern and target pests. A single injection depth may be determined and used for each application, with the shanks 20, 22, 24, etc., all being within the same plane. It will be appreciated that the distance between each adjacent shank will depend upon, among other things, the width of the treatment area. A preferred spacing between shanks in connection with the injection of the fumigant iodomethane in accordance with the present invention is about 12 inches, as shown in FIG. 4. Referring to FIG. 4, for a soil bed having a 34 inch width, two shanks spaced about 12 inches apart and about 11 inches from the edges of the bed may be suitable. More generally, for the application of, for example, iodomethane in accordance with the present invention, adjacent shanks may be spaced about 6 inches to about 24 inches apart, more preferably about 8 inches to about 24 inches apart, and most preferably about 12 inches to about 24 inches apart. Of course, spacings of the shanks greater than 24 inches apart, if desirable, are within the scope of the invention. For example, while 20 inch spacings is typical for deep rooted crops, the spacing may be as much as 60 inches apart. Further, tubing 60, 100, 142, 144, 146, etc., for transfer of the material through the system and into the soil should be compatible with the material being injected. In this regard, when injecting iodomethane into soil in accordance with the present invention, tubing material which is durable and will not corrode should be used, as one skilled in the art would recognize. For example, when injecting iodomethane, the tubing may be stainless steel or a perfluoroelastomer or fluoroelastomer, such as Kalrez® or Viton®, respectively, both of which are available from Du Pont Dow Elastomers, LLC of Wilmington, Del.

Figure 3A:
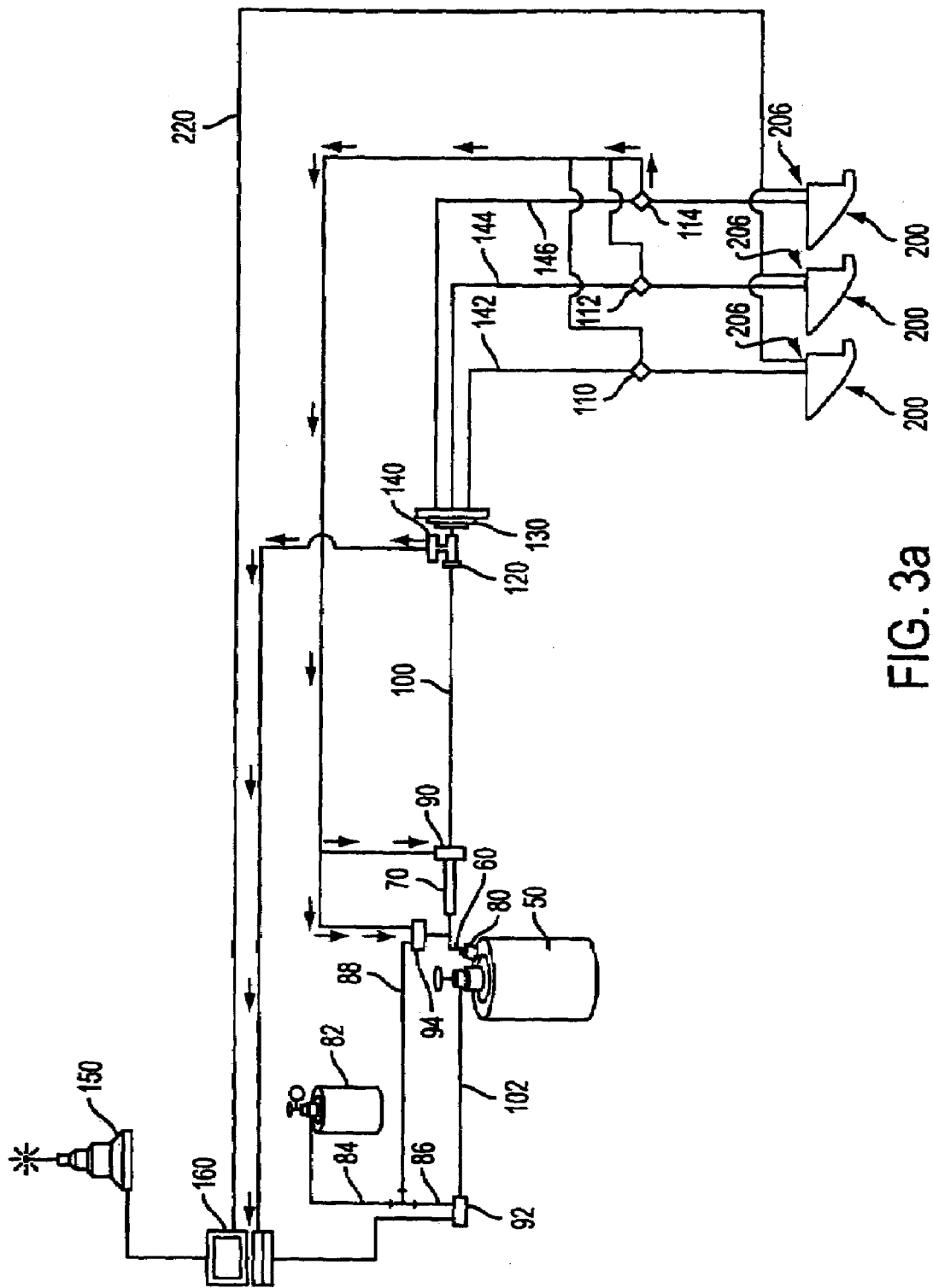
FIG. 3a shows a preferred embodiment of an apparatus wherein electrically controlled injectors are mounted to shanks for injecting fumigant into soil.
Figure 6:
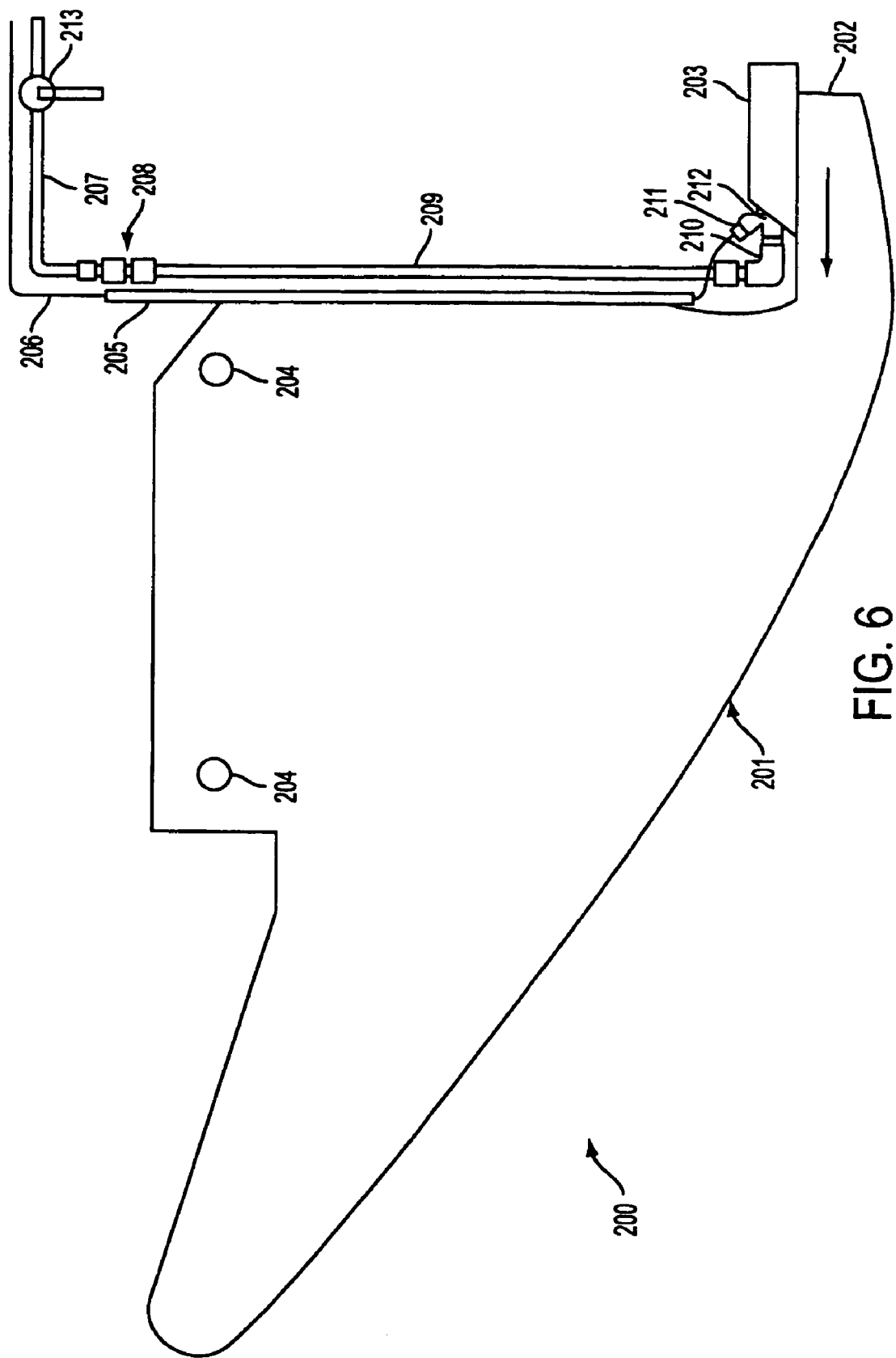
FIG. 6 is a side view of a shank according to a preferred embodiment of the present invention.

An alternate embodiment is shown in FIGS. 3a and 6-10b, wherein shanks 200 include electrically controlled injectors 212 (FIGS. 7, 10a and 10b) detachably mounted to each shank plate 201 (FIG. 6). FIG. 3a shows an apparatus for introducing a discrete, predetermined amount of material into soil at a plurality of predetermined points in the soil in accordance with the invention using shanks 200 in accordance with the alternate embodiment of the invention. It will be understood by those skilled in the art, however, that the alternate embodiment of the invention discussed here, namely, shanks 200 may be used with apparatus or methods that do not introduce a discrete, predetermined amount of material into soil at a plurality of points in the soil, but rather operate in another manner.

Computer 160 functions as a controller to provide electrical signals to each of the electrically controlled injectors via electrical cable 220. Electrical cable 220 includes wiring 206 for each electrically controlled injector. Thus, each injector operates to inject material at predetermined points in the soil when a signal from the computer is received.

Electrically controlled injector 212 is generally an electrically actuated solenoid valve which controls the release of material in response to an electrical current. In operation, the electrically controlled injector 212 opens to release the material which is under pressure into the soil when an appropriate electrical signal is received. In one exemplary embodiment, the electrically controlled injector 212 may be a suitably modified fuel injector, similar to the type used in automotive applications. When automotive type fuel injectors are utilized, the internal structure is preferably modified to include a non-corrosive material such as stainless steel in order to prevent corrosion effects from exposure to the material flowing through the injector, and a diffusion plate typically provided at the opening of a fuel injector to inject fuel in a diffuse manner, is removed.

Figure 7:
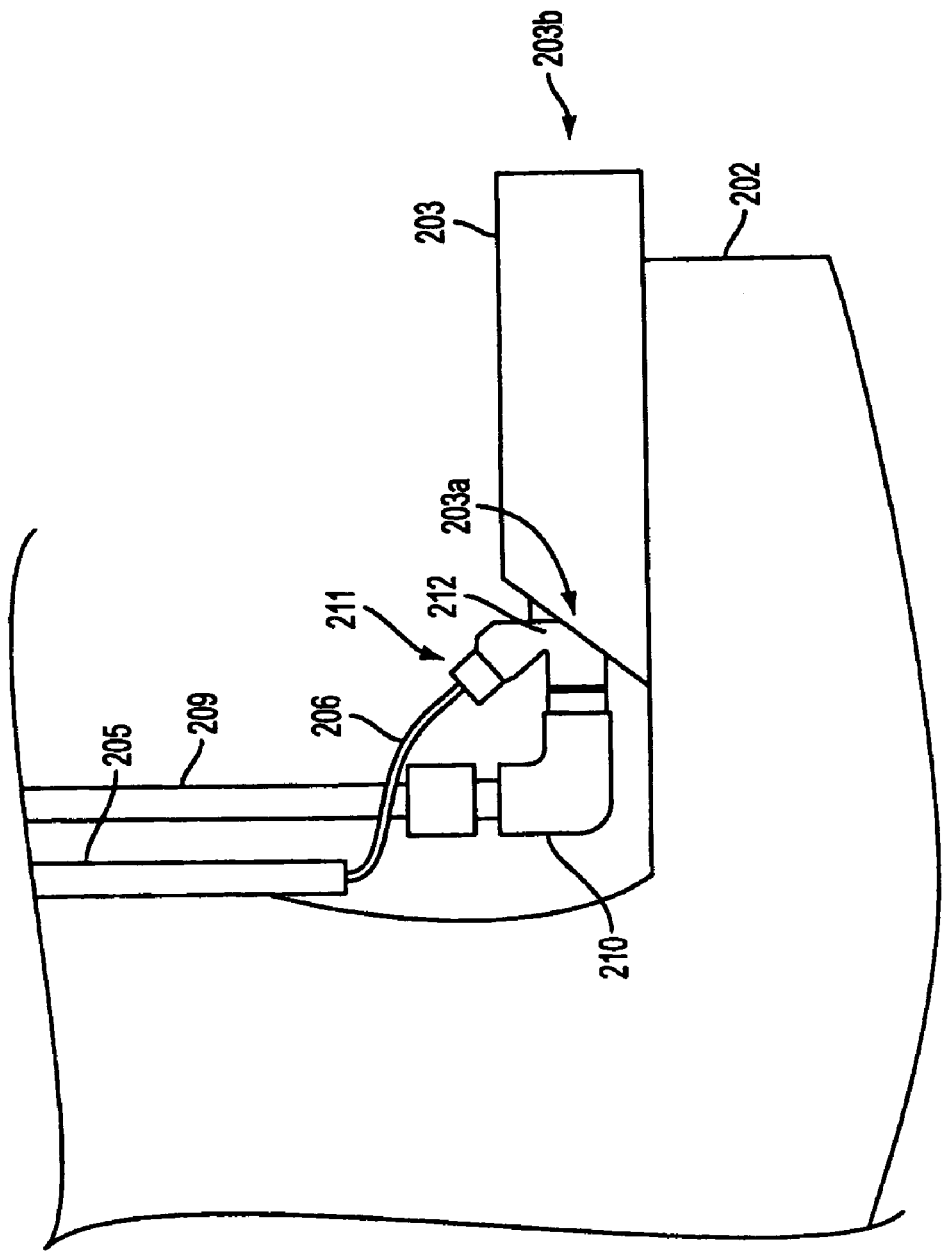
FIG. 7 is a side view of a portion of the shank of FIG. 6.

The structure of shank 200 and related elements are shown in FIGS. 6-9. Shank 200 includes a base which is preferably a plate 201 and injector mounting member 203 which is attached to a surface of shank plate 201. The exact location of injector mounting member 203 is not limited. As shown in FIG. 6, for example, injector mounting member 203 may be mounted on a lower trailing region 202 of shank plate 201. A detailed view of the electrically controlled injector inserted into injector mounting member 203 is shown in FIG. 7. Thus, an electrically controlled injector 212 which is mounted on the plate can be at a desired depth beneath the ground surface when the material is released into the soil.

Injector mounting member 203 is adapted to receive at least a portion of an electrically controlled injector 212 by, for example, a friction fit. Further, injector mounting member 203 may be constructed from, for example, a hollow cylindrical member, such as a length of tubing which is of sufficient diameter to axially receive a portion of electrically controlled injector 212. The injector mounting member 203 is suitably mounted on region 202 of plate 201 at a location that allows for injector 212 to be slide out of injector mounting member 203 in the direction of the arrow shown in FIG. 6. This facilitates easy insertion and removal of injector 212 for maintenance, etc. In this regard, opening 203a of injector mounting member 203 may be slanted to facilitate insertion of injector 212 into injector mounting member 203 and removal therefrom by a pivoting movement of injector 212 relative to injector mounting member 203. Injector mounting member 203 is shown as a tubular element in FIGS. 6-9, but may be any suitable shape. That is, other structures may be employed to detachably retain the electrically controlled injector 212 to the shank plate 201 of shank 200.

Referring for example to FIG. 6, Further, each shank tubing line (142, 144, and 146 in FIG. 3a) includes manifold tubing section 207 which connects to manifold 130 and injector tubing section 209. Injector tubing section 209 is connected to elbow connector 210 at a first end and fitting 208 at a second end. At the first end of injector tubing section 209, elbow connector 210 is detachably connected to the fluid input port of electrically controlled injector 212 (see FIGS. 10a and 10b). At the second end, fitting 208 provides for the connection of injector tubing section 209 to manifold tubing section 207. When needed, injector tubing section 209 may be detached from manifold tubing section 207 at fitting 208, as when maintenance operations are performed. Additionally, a shut-off valve 213 is provided at a location in manifold tubing section 207 in proximity to shank 200.

Shut-off valve 213 is operational to prevent the flow of fluid from manifold tubing section 207 when shut-off valve 213 is in a closed state. Conversely, shut-off valve 213 is in an open state during application of the material to soil. By locating shut-off valve 213 as described, the release of material from within the tubing is limited to that which may be downstream of shut-off valve 213 during maintenance operations. Thus, unintended release of the material is minimized, and exposure to the material by operators is reduced when maintenance operations are performed.

Also, wiring tube 205 is attached to shank plate 201 for receiving wiring 206 therethrough. Wiring tube 205 protects the wiring from damage and disruption of the connection with the electrically controlled injector when regions of shank 200 are in the soil. Wiring tube 205 may be attached to shank plate 201 longitudinally in a direction from an upper portion of the shank plate 201 to a lower portion. Wiring 206 includes a connector 211 which is connected to a corresponding electrical connector of the electrically controlled injector 212 at a first end of wiring 206. The second end of wiring 206 is connected to computer 160, as shown in FIG. 3a, which provides an electrical signal to control operation of electrically controlled injector 212.

Plate 201 of shank 200 includes holes 204 in an upper region thereof to facilitate installation of the shank plate to an apparatus which pulls the shank plate at a predetermined depth through the soil, such as the type which is pulled behind a tractor or other vehicle (not shown). It will be understood that shank 200 may be any suitable type of shank, not necessarily a plate such as plate 201. Shank 200 may take any suitable form. Further, the shape of plate 201 is not limited to the shape shown in FIGS. 6-9, and shank 200 may include any suitable shape provided it allows for injection of material at a desired depth into the soil in accordance with aspects of the present invention.

As shown in FIG. 8a, shield 214 may be attached to plate 201 of shank 200. Shield 214 is included to prevent damage to and clogging of the electrically controlled injector 212 during operating conditions wherein injector 212 is beneath ground level.

Figure 8B:
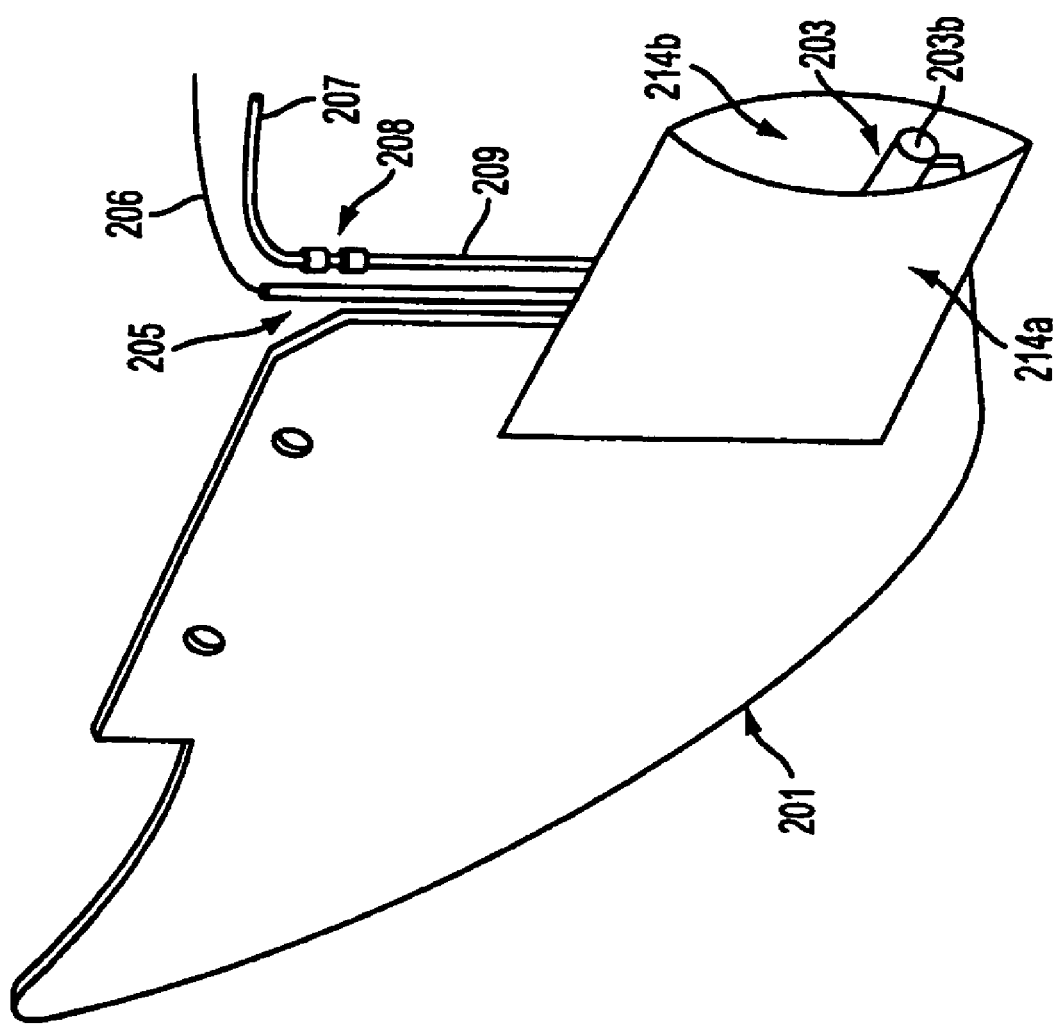
FIG. 8b is a perspective view of the shank with an attached shield.
Figure 9:
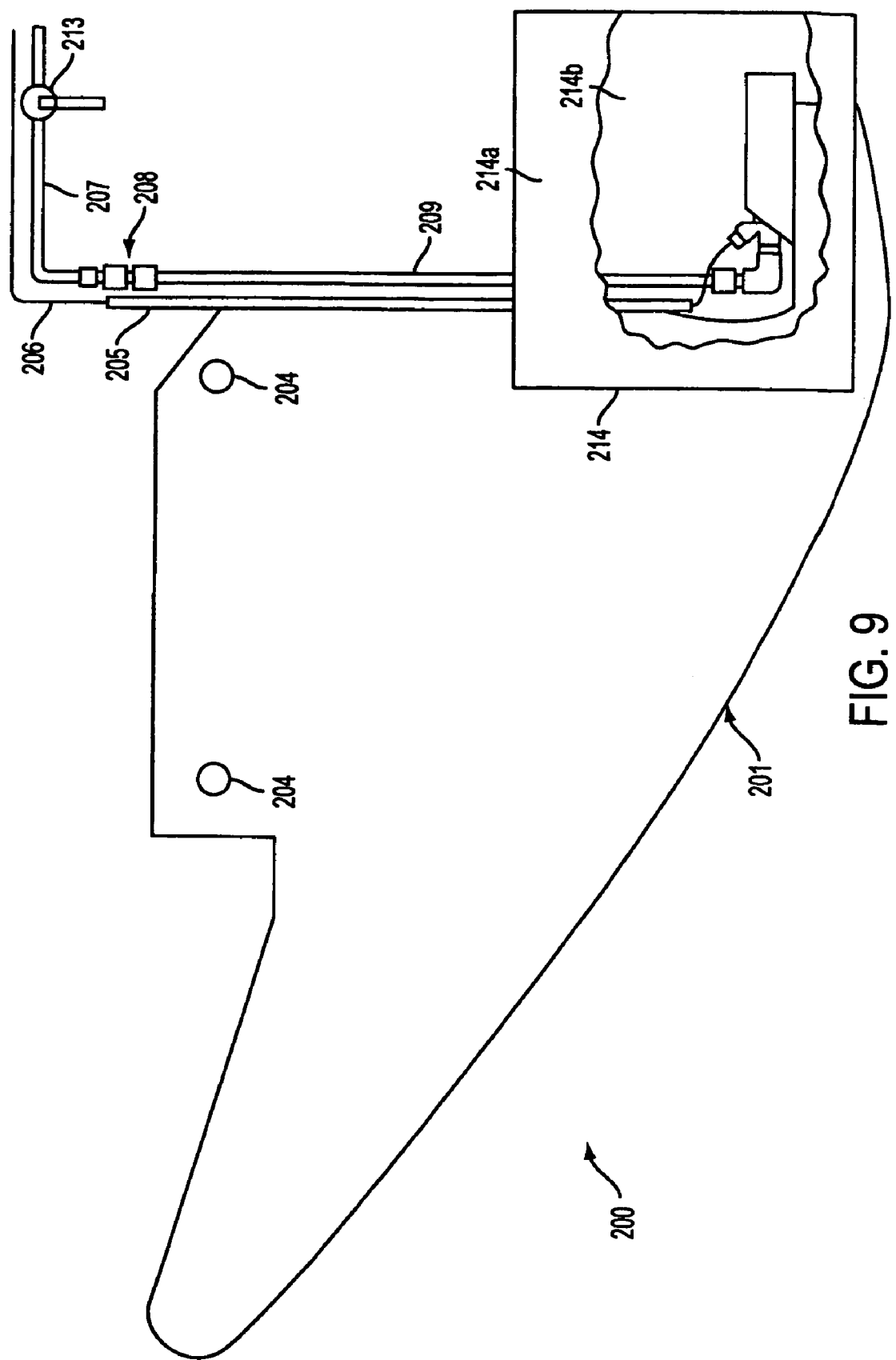
FIG. 9 is a side view of the shank with a partial cutaway view of the shield shown in FIG. 8a showing the electrically controlled injector located between a first shield member and a second shield member.

Referring to FIGS. 8b and 9, shield 214 comprises a first shielding member 214a and second shielding member 214b. First shielding member 214a is attached to a first side of plate 201, and second shielding member 214b is attached to an opposing side, both being attached to plate 201 by a weld or any other suitable connection.

Figure 10A:
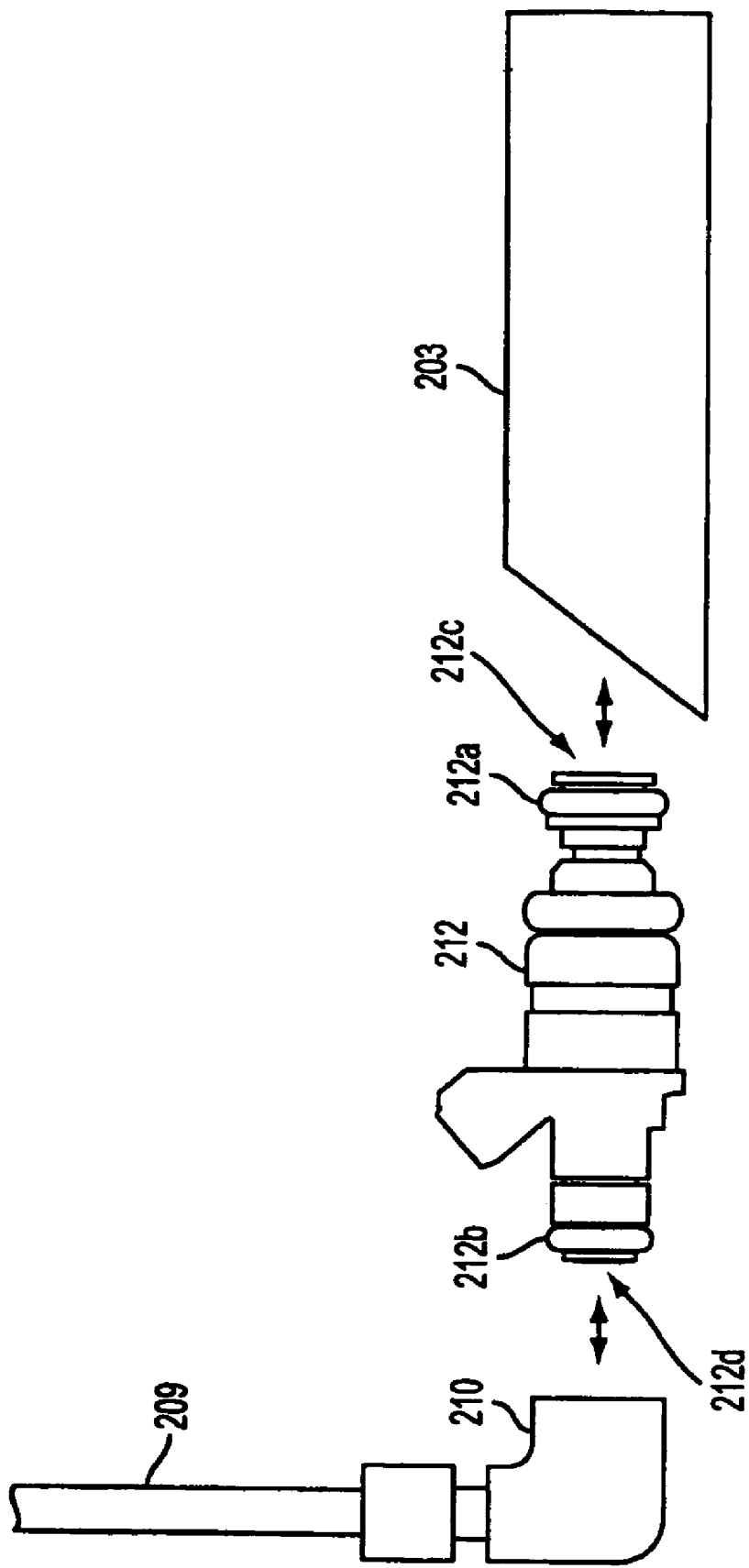
FIG. 10a is an exploded side view showing the connection and disassembly of an injector tubing section, an electrically controlled injector and an injector mounting member.
Figure 10B:
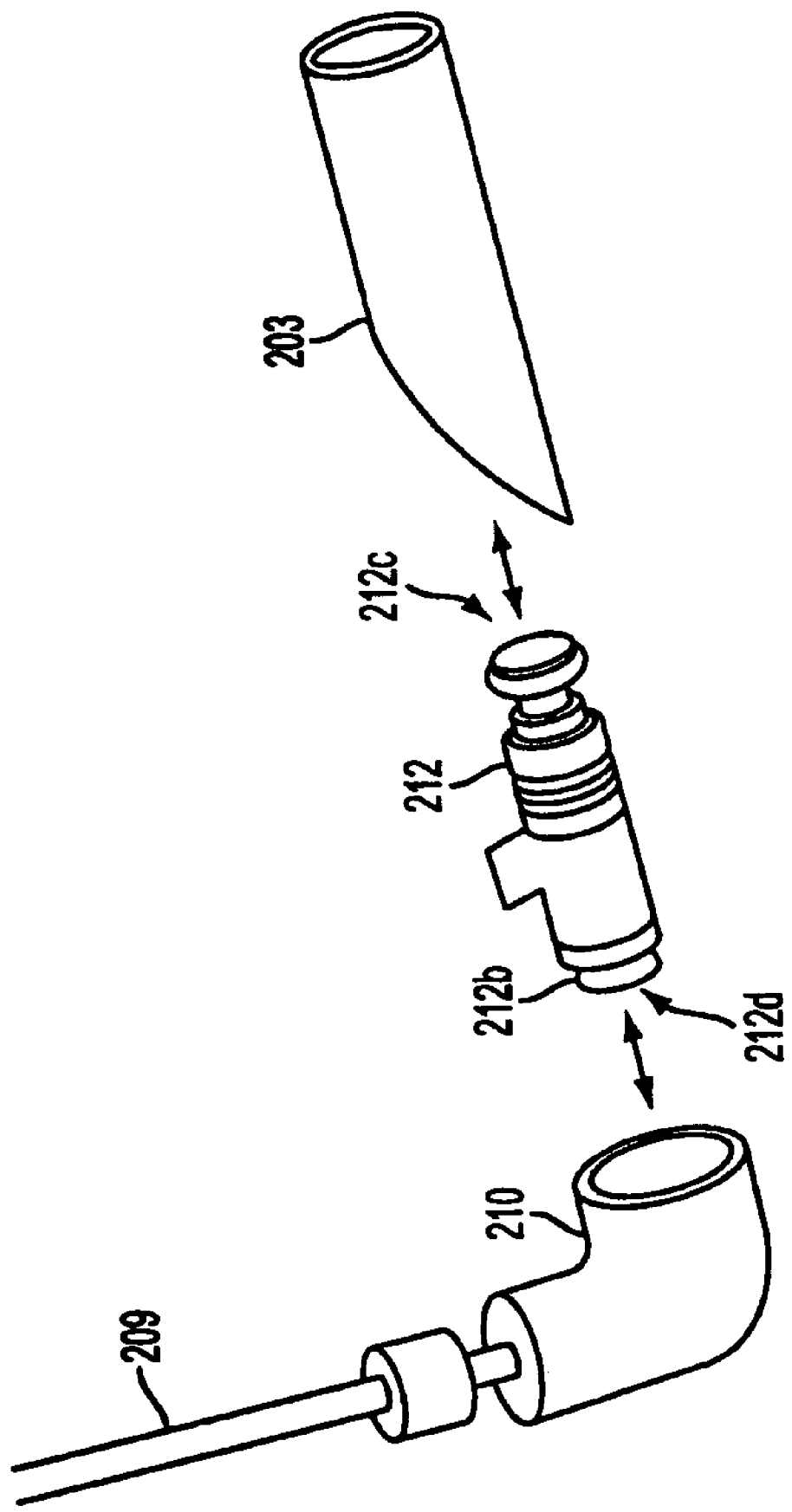

Referring to FIGS. 10a and 10b, the connection and disassembly of injector tubing section 209, electrically controlled injector 212, and injector mounting member 203. Electrically controlled injector 212 includes o-ring 212a at a first end near output nozzle 212c and o-ring 212b at a second end near input port 212d. As described above, injector tubing section 209 includes elbow connector 210. Elbow connector 210 is inserted over a portion of electrically controlled injector 212 which receives the material from shank tube line 209. O-ring 212b on electrically controlled injector 212 provides for a fluid tight fit between electrically controlled injector 212 and elbow connector 210 of injector tubing section 209. Electrically controlled injector 212 is axially inserted in injector mounting member 203. O-ring 212a provides for retention of electrically controlled injector 212 within a portion of injector mounting member 203 when electrically controlled injector 212 is inserted therein.

Electrically controlled injector 212 may be easily detached from injector mounting member 203 by pulling the components apart. Similarly, electrically controlled injector 212 may be detached from elbow connector 210 of injector tubing section 209 by pulling electrically controlled injector 212 apart from elbow connector 210. By providing for the connection and disconnection of injector tubing section 209, electrically controlled injector 212 and injector mounting member 203 as described above, maintenance operations can be performed quickly and equipment down time can be reduced.

Also, the use of electrically controlled injectors 212 which are mounted on shanks 200 in accordance with the present invention provides for enhanced control over the amount of material which is injected into the soil.

In addition, by providing shut-off valves 213 installed on manifold tubing section 207, the release of material is minimized during maintenance operations.

In accordance with the present invention, the apparatus may be charged with the amount of material needed for a single injection. Thus, priming the entire system is not necessary and, between injections, material may not be present in all the lines. This action makes cleaning of the equipment easier since there is little to none of the material to expel from the lines once the target area has been treated. Nitrogen or compressed air can then be used to rid the lines and to help minimize the potential for exposure typically associated with conventional equipment.

The invention may be better understood with reference to the accompanying example, which is intended for purposes of illustration only and should not be construed as in any sense limiting the scope of the invention as defined in the claims appended hereto.

EXAMPLE

Iodomethane is injected as a fumigant into soil having the following characteristics: pH of 6-8, organic matter—1-3% by wt., % moisture—50-90 (sealed holding capacity), in accordance with the present invention in the following manner in preparation for planting strawberries in the soil.

A container of the apparatus is charged with iodomethane, and the apparatus is positioned at a location in the treatment area whereby 2 shanks are located in the same plane at a depth of 10 inches in a soil bed 38 inches wide, the shanks being spaced 24 inches apart. Based upon information previously inputted into the computerized controls of the apparatus, an amount of 3 ml of iodomethane is drawn from the tank for injection into the soil by all the shanks and placed in a reservoir. Following opening a solenoid switch at the reservoir, this amount of iodomethane then flows through tubing by means of compressed gas to a manifold which distributes the iodomethane equally among 2 shank tube lines, each of which has a nozzle associated with each of the shanks. In this manner, 1.5 ml of iodomethane is injected from each nozzle into the soil where the iodomethane immediately vaporizes into a gas and creates a diffusion pattern in the soil that is either spherical or elliptical in shape, having an effective treatment diameter of about 24 inches. Gas sensors located near the nozzles of the tube shank lines determine when all the iodomethane has been expelled from the shank tubing lines and the solenoid switch opening the reservoir is closed. The apparatus is then moved 12 inches in a straight path to a second position whereat a second injection of iodomethane is carried out by the sequence of iodomethane transfer and valve openings discussed above.

While the present invention has been described with reference to preferred embodiments and illustrative examples, it should be understood that one of ordinary skill in the art after reading the foregoing specification would be able to effect various changes, substitutions of equivalents and modifications to the methods as described herein. Therefore, it is intended that the scope of the invention not be limited by reference to the illustrative example, but rather with reference to the accompanying claims.

What is claimed is:

1. An apparatus for introducing a discrete, predetermined amount of material into soil at a plurality of predetermined points in the soil, comprising:

a container for holding the material to be introduced into the soil;

tubing in fluid communication with the container at a first end thereof;

at least one electrically controlled injector, said electrically controlled injector being in fluid communication with a second end of said tubing;

at least one shank, said shank comprising a base, and an injector mounting member attached to the base, the injector mounting member being adapted for detachably mounting the electrically controlled injector onto the base; and a controller for activating the electrically controlled injector whereby the electrically controlled injector mounted on the base introduces the discreet, predetermined amount of material into the soil at predetermined points in the soil.

2. An apparatus according to claim 1, wherein the base is a plate.

3. An apparatus according to claim 1, further comprising a source of compressed gas for forcing the discrete, predetermined amount of material through the tubing and into the soil when the at least one electrically controlled injector is activated.

4. An apparatus according to claim 1, further comprising a shield attached to the base for shielding the electrically controlled injector from the soil.

5. An apparatus according to claim 4, wherein the shield comprises a first shielding member attached to a first side surface of the base and a second shielding member attached to an opposing side surface of the base, the first shielding member and shielding member together partially enclosing and shielding the electronically controlled injector from dirt while allowing the electronically controlled injector to introduce the discreet, predetermined amount of material into the soil at the predetermined points in the soil.

6. An apparatus according to claim 1, further comprising an electrical wiring tube attached to a surface of the base for receiving electrical wiring for connecting the electrically controlled injector to the controller.

7. An apparatus according to claim 1, wherein the injector mounting member comprises a hollow member adapted to receive at least a portion of the electrically controlled injector inserted therein.

8. An apparatus according to claim 7, wherein the injector mounting member comprises a hollow cylindrical member.

9. An apparatus according to claim 7, wherein the electrically controlled injector is axially inserted at least partially into the hollow member.

10. An apparatus according to claim 1, further comprising a manifold, the manifold being in fluid communication with the tubing at one end thereof, and being in fluid communication with a plurality of shank tubing lines at a second end thereof, each shank tubing line being associated with a corresponding shank and having a distal end for providing the predetermined amount of material to the electrically controlled injector which is detachably mounted to each of said shanks.

11. An apparatus according to claim 10, wherein each shank tubing line comprises a cut-off valve installed in proximity of the shank for preventing flow of the material through the shank tubing line when the cut-off valve is in a closed state.

12. An apparatus according to claim 11, wherein each shank tubing line comprises an manifold tubing section which is connected to the manifold and an injector tubing section which is detachably connected to the electrically controlled injector, wherein the manifold tubing section is detachably connected to the injector tubing section by a fitting.

13. An apparatus according to claim 12, wherein the injector tubing section includes an elbow connector at a first end thereof which is detachably connected to an input port of the electrically controlled injector.

14. An apparatus according to claim 10, further comprising an orifice plate connected to the manifold for regulation of the flow of the discrete, predetermined amount of material and the compressed gas.

* * * * *